Nov. 24, 1942.                J. BANNEYER                2,302,668
                         CONDUIT SUPPORTING DEVICE
                         Filed Oct. 24, 1940          2 Sheets—Sheet 1
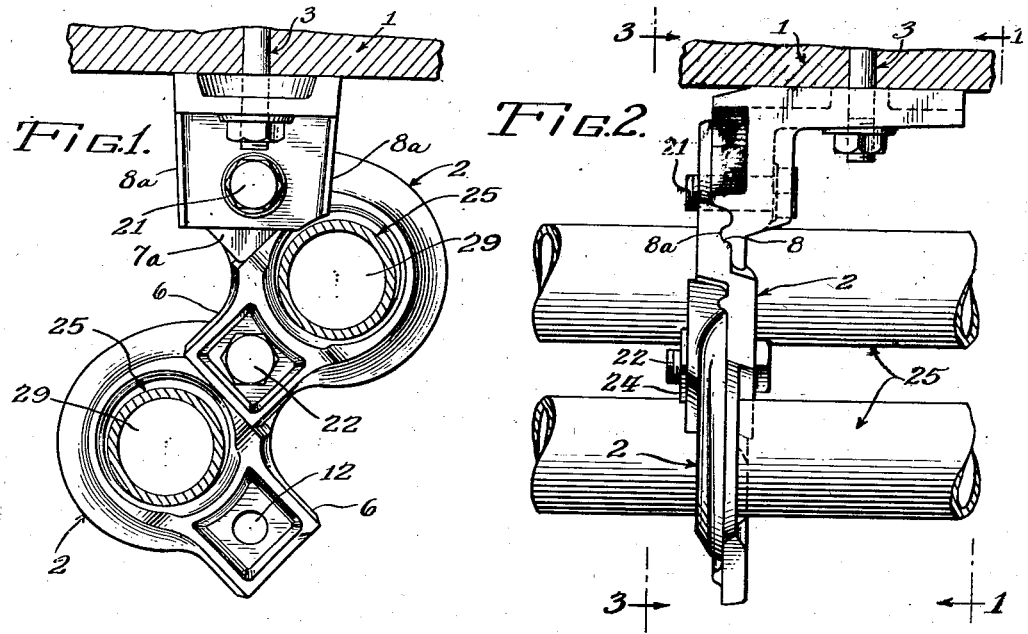
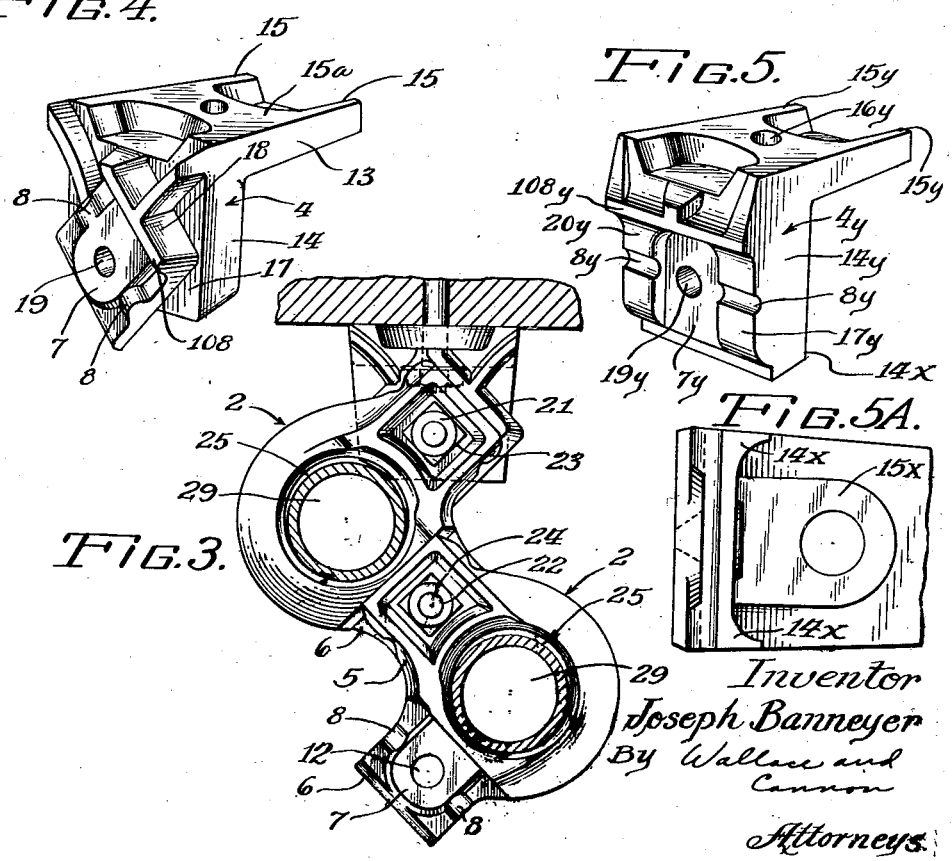
Inventor
Joseph Banneyer
By Wallace and Cannon
Attorneys Nov. 24, 1942.                J. BANNEYER                    2,302,668
                        CONDUIT SUPPORTING DEVICE
                         Filed Oct. 24, 1940          2 Sheets-Sheet 2
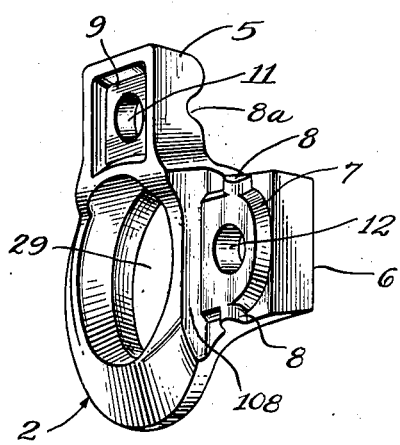
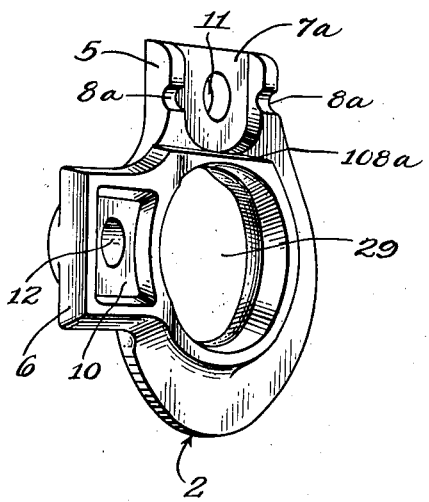
Inventor
Joseph Banneyer
By Wallace and Cannon
Attorneys Patented Nov. 24, 1942

2,302,668

UNITED STATES PATENT OFFICE 2,302,668

CONDUIT SUPPORTING DEVICE

Joseph Banneyer, Chicago, Ill.

Application October 24, 1940, Serial No. 362,532

5 Claims. (Cl. 248—68)

This invention relates generally to pipe or electrical conduit supporting devices and especially to devices suitable for supporting or hanging a plurality of electrical conduits.

It is well known to mechanics skilled in the art that it is customary to support each electrical conduit as a single unit by means of a separate hanger or structure. It is also well known that the use of a separate hanger for each conduit results in a waste of space and that in order to support the required number of conduits, when there is only a limited space available, it is often necessary to crowd the conduits and their supporting hangers so closely together as to make it difficult, if not impossible, to re-wire or repair certain conduits without removing one or more of the other conduits. It will be noted, in this connection, that such supporting of each conduit as a separate unit is necessary because no supporting device has heretofore been available which has been capable of being generally used to support a plurality of electrical conduits under the various conditions which are encountered in electrical work.

As a matter of safety and to insure proper operation, wires of different voltage may not be installed in the same conduit. Also, the underwriters' rules limit the number of wires which may be supported in one conduit. Therefore, especially in industrial installations where a large number of wires must be supported, electrical conduits are always installed in groups. Such an installation requires a large number of conduits and, obviously, the present method of supporting each conduit from a separate hanger requires a correspondingly large number of hangers.

The present method of separately supporting each conduit from a wall, ceiling or beam is costly for various reasons. When separate hangers are used conduits are installed at the same level. Thus, the running in of branch conduits is always a problem and necessitates bending and offsetting certain conduits to provide room for making the proper connections. Such bending and offsetting of the conduits requires many hours of extra labor and also decreases the salvage value of these conduits when the installations are revised, which is often required in industrial plants. Also, the present method of separately supporting each conduit requires the drilling of a number of holes in steel or concrete structures of the building, and these structures can not be repaired satisfactorily when the conduits are removed or the system is remodeled. Thus the supporting of each conduit from a separate hanger is costly not only in that it is a waste of space and requires a large number of hangers but also because such installations require many extra hours of labor and permanently damage the building and the conduits.

Such multi-conduit supporting devices as have heretofore been produced have been capable of only very limited use, being designed for special purposes and for use under certain conditions and in certain places or positions and were not designed to be used in the general field of electrical work under the various conditions which are encountered in such work. Such prior art devices as have been introduced into the field and which are capable of supporting a plurality of conduits have a fixed or permanent shape and hence these devices are suitable for use only under special and favorable conditions. However, such special and favorable conditions are not always encountered and it is often the case that, because of limited space or for other reasons, the conduit cannot be arranged in the desired fixed position and that in order to arrange the conduits in the limited space available, it is necessary to rely on single-conduit hangers of which there are a number of types in the prior art.

Therefore, one object of my invention is to provide a device which is capable of supporting a plurality of electrical conduits in any one of various positions and which is so constructed that the position of the various conduits supported thereby may be adjusted or varied to allow ready access to each and every conduit for purposes of re-wiring or repairing, and which is so constructed that this positioning may be accomplished even though it may be necessary to fit the conduits into a very limited space.

Another object of my invention is to provide a device which can be supported from various supporting surfaces such, for example, as a ceiling, wall or floor with equal ease and by means of the same structure.

Another object of my invention is to provide a device which will support a plurality of electrical conduits from one ceiling bracket, and by which electrical conduits installations may be made in a much more economical manner than is possible with the devices heretofore available.

Another object of my invention is to provide a device for supporting a plurality of electrical conduits made up of parts which may be arranged to permit variation in the routing of electrical conduits to take advantage of certain spaces which offer no or few obstacles to such conduit installations.

A further object of my invention is to provide a device which will support a plurality of electrical conduits in such a manner that wiring fittings and junction boxes may be placed in accessible positions and branch conduits may be run from these wiring fittings or junction boxes without interference from other conduits in the same group.

Where it is necessary to support a number of conduits it is desirable to have a device which will vary in size in accordance with the number of conduits actually being supported at any one time, and which does not require the presence of surplus structure to allow for any additions which may have to be made in the future. Therefore, another object of my invention is to provide a device which is made up or composed of separate parts which may be attached directly to each other and which may be easily added to or removed from the structure in accordance with the need for supporting a greater or lesser number of electrical conduits, and which will allow changes to be made in one or more conduits without disturbing the remainder of the conduits supported thereby.

Another object of my invention is to provide a conduit-supporting device which may be so arranged as to reduce or minimize the tortion and stress on the supporting structure.

A further object of my invention is to provide a conduit-supporting device which is made up of interchangeable parts which facilitates assembly thereof and allows greater diversity in arrangement of the conduits supported thereby and in size of such conduits.

A still further object of my invention is to provide a conduit-supporting device embodying interchangeable parts which are so constructed as to be interlocking when assembled, and thus prevent the conduits supported thereby from slipping out of the position in which they are placed.

Another object of my invention is to provide a conduit-supporting device made up of interchangeable and interlocking parts which may be economically manufactured by either casting, drop-forging or stamping.

Other and further objects of the present invention will be apparent from the following description and claims, and are illustrated in the accompanying drawings which, by way of illustration, show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings,

Fig. 1 is a front elevational view showing a preferred embodiment of the invention;

Fig. 2 is a side elevational view of the form of the invention shown in Fig. 1;

Fig. 3 is a rear elevational view of the form of the invention shown in Fig. 1;

Fig. 4 is a rear perspective view of the bracket used to secure the structure, shown in Fig. 1, to a horizontal support such as a ceiling;

Fig. 5 is a rear perspective view of a slightly modified form of bracket which may be used in place of that structure shown in Fig. 4;

Fig. 5A is a bottom plan view of a portion of that structure shown in Fig. 5;

Fig. 6 is a rear perspective view of one form of the conduit-supporting clamp which is embodied in the structure shown in Fig. 1;

Fig. 7 is a front perspective view of the structure shown in Fig. 6.

A preferred form of the invention is shown in Figs. 1 to 7, inclusive, and comprises conduit-supporting members 2 which are supported from a horizontal surface such as the ceiling 1 by means of a bolt 3 and supporting bracket 4.

As best shown in Figs. 6 and 7 each of the conduit-supporting members 2 has a hole 29 formed therein which is adapted to receive a pipe or conduit to be inserted therein. Each of the members 2 includes two ears 5 and 6 which project radially from the main body of the member 2. The rear surface of ear 6 has a tongue 7 and ribs 8 protruding therefrom, while the rear surface of the ear 5 has a square indentation 9 therein. As best illustrated in Fig. 7, the front surface of the ear 6 is identical in shape and form to the rear surface of the ear 5, having a square indentation 10 therein, while the front surface of the ear 5 is so formed that it is complementary to the rear surface of the ear 6, having a tongue-shaped groove 7a and a rib-shaped groove 8a therein. The ears 5 and 6 have bolt holes 11 and 12 formed therein through their respective centers as shown in Figs. 6 and 7.

It will be noted that two members of the character illustrated in Figs. 6 and 7 may be securely fastened together by positioning the ear 6 of the member shown in Fig. 6 so that the tongue 7 and ribs 8 of one member fit into tongue-shaped grooves 7a and rib-shaped grooves 8a, respectively, of the ear 5 of the other member and, then, placing a bolt through holes 11 and 12 and drawing it up securely by means of a nut, it being understood that two members embodying the structure of the member shown in Figs. 6 and 7 are thus employed. When thus fastened it is obvious that the two members are interlocked in such a manner as to insure that they will not slip from their desired position.

It will also be noted that shoulder 108 is provided on the inner end portion of the ears 5 and 6, so that when said ears are fastened together the outer end of one ear butts up against the shoulder 108 of the attached ear. This construction serves as a reinforcement and to take part of the load off of ribs 8, and although not of major importance in the construction of the smaller members, such as those illustrated in Figs. 6 and 7, it is of greater importance in the construction of members which are provided to carry the heavier conduits and which will be discussed later.

The ears 5 and 6 of the member 2 are shown as extending substantially at right angles to each other. However, it is to be understood that this is merely the form I have chosen to illustrate and that this angle may be varied on different clamps to allow for variations in the positions of the conduits supported thereby with respect to each other.

It is also to be understood that the tongue and rib structure previously described and used in this preferred form and modified forms of my invention, described hereinafter, need not be of the exact shape that I have chosen to illustrate. Slight changes may be made in the construction, such as making the tongue circular in shape and setting the ribs at different angles to allow for adjustment of the members, and such changes or modifications are to be included within the scope of my invention.

Referring now to Fig. 4, the details of the wall or supporting bracket 4, shown in Fig. 1, are there shown. The bracket 4, as shown in Fig. 4, has an upper portion or arm 13 which is adapted to be attached to a ceiling, wall or other supporting member, and a lower portion or arm 14 to which conduit-supporting members may be attached; these arms 13 and 14 intersecting each other at about a right angle, as shown.

In its preferred form of construction the arm 13 has two ribs 15 projecting upwardly along the side edges thereof, and a reinforcing web 15a positioned between the ribs 15. I prefer using these ribs because they present a more uniform bearing surface against uneven surfaces of supporting structures, such as walls, ceilings and the like, and reduce or prevent "rocking" on such surfaces. The arm 13 has a bolt hole 16 therein through the center of web 15a and through which a bolt or screw 3 may be inserted and by means of which the bracket 4 may be screwed or drawn up tightly against a supporting member such as the ceiling 1, as shown in Fig. 1.

The rear face 17 of the arm 14 of the bracket 4 has a raised portion 18 from which the previously described tongue 7 and ribs 8 protrude and a bolt hole 19 is provided in this arm 14 as shown.

Referring now to Figs. 5 and 5A it will be noted that wall bracket 4y is similar to wall bracket 4 shown in Fig. 4, the only difference being that the rear face 17y of the arm 14y of wall bracket 4y does not have the raised portion 18 and its included parts of bracket 4, but has instead the tongue-shaped groove 7y and the rib-shaped grooves 8y, and the bolt hole 19y formed therein, and that reinforcing boss 15x and reinforcing material 14x have been added to give the structure greater strength and rigidity.

It will be noted, by reference to Figs. 4 and 5, that conduit member 2 may be easily fastened to the wall or supporting bracket 4, in interlocking relation therewith, by positioning the grooves 7a and 8a of the ear 5 in engagement with tongue 7 and ribs 8 respectively of the rear surface 17 of the arm portion 14, or may be fastened to wall or supporting bracket 4y, in interlocking relation therewith, by positioning the tongue 7 and ribs 8 of ear 6 in engagement with grooves 7y and 8y respectively of the rear surface 17y of the arm 14y and, finally, placing a bolt through the hole 19 and also through either hole 11 or 12—depending on whether the ear 5 or 6 is used—and drawing the ear (5 or 6) and arm 14 tightly together by means of a nut on said bolt.

In the form of wall bracket 4y and 4 that I have chosen to illustrate I have shown the interlocking portion 7a in vertical position and the interlocking portion 7 at an angle of substantially forty-five degrees relative to the vertical, it being understood that these parts may be arranged at other angles, if desired, so as to vary the angle at which the conduit is hung or suspended by the new member from the supporting bracket.

Now, referring again to Figs. 1, 2 and 3 it is obvious that the supporting bracket 4 has been attached to the ceiling 1 by means of the bolt 3; that the ear 5 of one conduit member 2 has been interlocked with the angled portion 18 of the bracket 4 and fastened thereto by means of a bolt 21 and nut 23; that the ear 6 of the member 2 has been interlocked with the ear 5 of the next adjacent member 2 in the manner previously set forth and fastened thereto by means of a bolt 22 and nut 24; and that in this manner a structure has been formed which is capable of supporting the two conduits 25.

It will likewise be noted that by continuing to attach the ear 6 of one conduit member to the ear 5 of the next succeeding clamp any desired number of conduits may be supported by the one wall or supporting bracket 4 and it is obvious that by using conduit members which have ears, such as 5 and 6, protruding therefrom at different angles, and interlockingly attaching these ears to each other, in the manner set forth above, the relative positions of the conduit members 2 may be varied as desired and thus the conduits themselves supported or hung in any desired position.

It will also be noted that in order to support the chain of conduit members from the rear face of the wall or supporting bracket 4y it is merely necessary to reverse the chain of conduit members and attach the ear 6 to the rear face 17y of the wall bracket 4y and then support each conduit member thereafter from the preceding conduit member by attaching the ear 5 of the preceding member 2 in the chain to the ear 6 of the following clamp 2 in said chain, a manner opposite to that previously described.

From the foregoing description of my invention, it is evident that the same may be used in a variety of ways and that it is adaptable to support single electrical conduits or a plurality of electrical conduits in any practical manner that a mechanic or electrician may desire, and that it is constructed of a number of separate elements which may be economically manufactured by casting, drop-forging or stamping and which are so constructed that when they are placed together they form a sturdy interlocking structure.

While I have illustrated and described preferred forms of my invention, it is to be understood that these are capable of variation and modification and I, therefore, do not wish to be limited to the precise details set forth but desire to avail myself of such changes and alterations as fall within the scope of the following claims.

I claim:

1. In a device of the character set forth, a bracket member equipped with a depending extension, means for securing the said bracket to a supporting structure, a plurality of conduit-supporting members, each provided with an opening through which a conduit may pass and each provided with at least two angularly-related ears, at least one of said ears being adapted to be brought into overlapping engagement with the depending extension of said bracket and the other ear being adapted to be brought into overlapping engagement with an ear of another supporting member, and means for securing said overlapping structures together.

2. In a device of the character set forth, a plurality of conduit-supporting members, each having an opening through which a conduit may pass and each having at least two angularly-related ears, the ears of one member being adapted to be brought into overlapping engagement with ears of another member, attaching elements for securing said overlapping ears together, and means for securing one of said conduit-supporting members to a supporting surface.

3. The structure described in claim 2 in which the overlapping ears are provided with a tongue on one ear received within a groove carried by the other ear, and in which the attaching element is a bolt extending through the overlapping ear portions.

4. In a device of the character set forth, a plurality of conduit-supporting members, each having an opening through which a conduit may pass and each having at least two angularly related ears, each of said ears being provided with a projection thereon and with a recess adjacent said projection and at the inner free end portion thereof, the ears of one member being adapted to be brought into overlapping engagement with the ears of another member where the said recess of one ear receives said projection of the overlapping other ear, attaching elements for securing said overlapping ears together, and means for securing one of said conduit supporting members to a supporting surface.

5. In a device of the character set forth, a bracket member equipped with a depending extension, means for securing the said bracket to a supporting structure, a plurality of conduit-supporting members, each provided with an opening through which a conduit may pass and each provided with a plurality of ears extending at different angles therefrom, at least one of said ears being adapted to be brought into overlapping engagement with the depending extension of said bracket and the other ear being adapted to be brought into overlapping engagement with an ear of another supporting member, interlocking elements carried by said depending extension and by said ears to provide an interlock between said overlapping ears and said overlapping ear and extension, and means for securing said overlapping and interlocked structures together.

JOSEPH BANNEYER.